US012365852B2

(12) United States Patent
Valdes Vergara et al.

(10) Patent No.: US 12,365,852 B2
(45) Date of Patent: Jul. 22, 2025

(54) OPAQUE COMPOSITIONS AND METHODS FOR THE SAME

(71) Applicant: Colgate-Palmolive Company, New York, NY (US)

(72) Inventors: Maria Antonieta Valdes Vergara, Mexico City (MX); Carlos Alberto Munoz Carrillo, Estado de Mexico (MX); Jose Manuel Hoffmann Alvarez, Mexico City (MX)

(73) Assignee: Colgate-Palmolive Company, New York, NY (US)

( * ) Notice: Subject to any disclaimer, the term of this patent is extended or adjusted under 35 U.S.C. 154(b) by 127 days.

(21) Appl. No.: 17/563,280

(22) Filed: Dec. 28, 2021

(65) Prior Publication Data

US 2022/0204888 A1 Jun. 30, 2022

Related U.S. Application Data

(60) Provisional application No. 63/132,414, filed on Dec. 30, 2020.

(51) Int. Cl.

| | |
|---|---|
| ***C11D 3/04*** | (2006.01) |
| ***C11D 1/22*** | (2006.01) |
| ***C11D 1/29*** | (2006.01) |
| ***C11D 1/37*** | (2006.01) |
| ***C11D 1/831*** | (2006.01) |
| ***C11D 3/20*** | (2006.01) |

(52) U.S. Cl.

CPC ................ *C11D 3/046* (2013.01); *C11D 1/29* (2013.01); *C11D 1/831* (2013.01); *C11D 3/2031* (2013.01)

(58) Field of Classification Search

None

See application file for complete search history.

(56) References Cited

U.S. PATENT DOCUMENTS

| | | | | |
|---|---|---|---|---|
| 5,066,749 | A * | 11/1991 | Leighton | C08F 220/04 526/318.2 |
| 5,110,506 | A * | 5/1992 | Ciallella | C11D 3/0036 510/400 |
| 5,308,530 | A * | 5/1994 | Aronson | C11D 3/3757 510/393 |
| 5,378,409 | A * | 1/1995 | Ofosu-Asante | C11D 10/042 510/432 |
| 5,415,814 | A * | 5/1995 | Ofosu-Asante | C11D 17/003 510/423 |
| 2004/0110657 | A1* | 6/2004 | Strothoff | C11D 1/825 510/426 |
| 2008/0004200 | A1* | 1/2008 | Boutique | C11D 3/33 510/393 |
| 2008/0221008 | A1* | 9/2008 | Mikkelsen | C11D 3/38618 510/393 |
| 2018/0105772 | A1* | 4/2018 | Gori | C12Y 301/21001 |
| 2019/0322962 | A1* | 10/2019 | Rivera Cruz | C11D 1/83 |
| 2019/0376004 | A1* | 12/2019 | Rodriguez Cedillo | C11D 3/50 |
| 2022/0025293 | A1* | 1/2022 | Meier | C11D 3/046 |
| 2022/0025305 | A1* | 1/2022 | Meier | C11D 1/83 |
| 2022/0135912 | A1* | 5/2022 | Piorkowski | C11D 9/442 510/416 |

FOREIGN PATENT DOCUMENTS

| | | |
|---|---|---|
| GB | 2205852 A | 12/1988 |

* cited by examiner

*Primary Examiner* — Lorna M Douyon

(57) ABSTRACT

Opaque cleaning compositions substantially free of opacifying agents and pearlizers, and methods for the same are disclosed. The cleaning composition may include a synergistic combination of a surfactant system and one or more salts. The surfactant system may include a nonionic surfactant and two anionic surfactants, and the one or more salts may include a multivalent ion. In some examples, the cleaning composition is free of thickeners.

12 Claims, No Drawings

OPAQUE COMPOSITIONS AND METHODS FOR THE SAME

This application claims the benefit and priority of U.S. provisional application Ser. No. 63/132,414, which was filed on Dec. 30, 2020. The content of the priority application is hereby incorporated by reference in its entirety into the present application, to the extent that it is not inconsistent with the present application.

BACKGROUND

Cleaning compositions such as light duty cleaning compositions may be used for cleaning a variety of surfaces including animate and inanimate surfaces. Inanimate surfaces include hard surfaces of the sort found in kitchens and bathrooms from sinks and work surfaces to pans and dishes. Such cleaning compositions may be formulated in solid, liquid, or gel forms, but are typically used in liquid forms (e.g., an aqueous liquid). The cleaning compositions generally include one or more surfactants, which may be nonionic surfactants, anionic surfactants, cationic surfactants, or amphoteric surfactants. The one or more surfactants function as emulsifiers, foamers, detergents, solubilizers, and wetting agents in the cleaning compositions. While it is conventional to include a mixture or combination of various surfactants in the cleaning compositions, it is still difficult to predict what effect combining the various surfactants may have because of the wide variation in the chemical structure of each individual surfactant. For example, complexes formed between chemically different surfactants may often give rise to compositions that may be unstable and/or form precipitates, thereby rendering them undesirable for consumers.

Pearling agents or pearlants are often utilized to impart opacity or pearlescence-like appearance to compositions, such as personal care compositions, homecare compositions, or the like. These compositions, however, may often include a large number of diverse ingredients/components that interact with one another to provide a stable composition having desired functional and/or physical characteristics. The effectiveness and compatibility of the diverse ingredients/components is often achieved through extensive research, time, and logistical efforts.

What is needed, then, are improved compositions that are capable of providing sufficient opacity, viscosity, and stability without the addition of pearling agents.

BRIEF SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing a surfactant system having one or more surfactants, and one or more salts. The surfactant system and the one or more salts may be present in synergistic amounts to provide opacity and stability to the cleaning composition.

In at least one implementation, the cleaning composition may be substantially free of pearlizers and opacifying agents.

In at least one implementation, the cleaning composition may be substantially free of thickeners.

In at least one implementation, the one or more surfactants may include sodium lauryl ether sulfate (SLES).

In at least one implementation, the one or more surfactants may include a linear alkylbenzene sulfonates (LAS). The LAS may include a C10-13 alkylbenzene sulfonate. The LAS may include sodium dodecylbenzenesulfonate (Na-DDBS).

In at least one implementation, the one or more surfactants may include a combination of SLES and LAS. The cleaning composition may include a ratio of LAS to SLES of from about 0.5:1 to about 1.5:1, preferably about 0.9:1 to about 1:1, more preferably about 1:1.

In at least one implementation, the one or more surfactants may include a nonionic surfactant and two anionic surfactants.

In at least one implementation, the nonionic surfactant may include alkoxylated fatty alcohol nonionic surfactants. The nonionic surfactant may include higher aliphatic primary alcohols having about 9 to 15 carbon atoms. The nonionic surfactant may include NEODOL® 91-8 (CAS No. 68439-46-3).

In at least one implementation, the two anionic surfactants may include LAS and SLES.

In at least one implementation, the one or more surfactants may consist of the nonionic surfactant and the two anionic surfactants.

In at least one implementation, the one or more salts may include one or more of a monovalent salt, a bivalent salt, or combinations thereof.

In at least one implementation, the one or more salts may include the bivalent salt, preferably the bivalent salt may include a calcium salt, more preferably the calcium salt may include calcium chloride.

In at least one implementation, the one or more salts may be present in an amount of from greater than 0 wt % to about 10 wt %, preferably about 1 wt % to about 2 wt %, based on the total weight of the cleaning composition, more.

In at least one implementation, the one or more surfactants may include LAS, SLES, and NEODOL® 91-8 in a ratio of about 3:3:2 to about 2:2:1, respectively. The one or more salts may include calcium chloride, optionally in an amount of from about 1 wt % to about 2 wt %.

The foregoing and/or other aspects and utilities embodied in the present disclosure may be achieved by providing a method for preparing any one of the cleaning compositions disclosed herein. The method may include contacting the surfactant system and the one or more salts with one another.

Further areas of applicability of the present disclosure will become apparent from the detailed description provided hereinafter. It should be understood that the detailed description and specific examples, while indicating some typical aspects of the disclosure, are intended for purposes of illustration only and are not intended to limit the scope of the disclosure.

DETAILED DESCRIPTION

The following description of various typical aspect(s) is merely exemplary in nature and is in no way intended to limit the disclosure, its application, or uses.

As used throughout this disclosure, ranges are used as shorthand for describing each and every value that is within the range. It should be appreciated and understood that the description in a range format is merely for convenience and brevity, and should not be construed as an inflexible limitation on the scope of any implementations or implementations disclosed herein. Accordingly, the disclosed range should be construed to have specifically disclosed all the possible subranges as well as individual numerical values within that range. As such, any value within the range may be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Unless otherwise specified, all percentages and amounts expressed herein and elsewhere in the specification should be understood to refer to percentages by weight. The amounts given are based on the active weight of the material.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

As used herein, "free" or "substantially free" of a material may refer to a composition, component, or phase where the material is present in an amount of less than 10.0 weight %, less than 5.0 weight %, less than 3.0 weight %, less than 1.0 weight %, less than 0.1 weight %, less than 0.05 weight %, less than 0.01 weight %, less than 0.005 weight %, or less than 0.0001 weight % based on a total weight of the composition, component, or phase.

All references cited herein are hereby incorporated by reference in their entireties. In the event of a conflict in a definition in the present disclosure and that of a cited reference, the present disclosure controls.

The present inventors have surprisingly and unexpectedly discovered that the combination of an anionic surfactant, namely, sodium lauryl ether sulfate (SLES), in an amount of about 2 wt % to about 3 wt % and calcium chloride in an amount of about 2 wt % to about 3 wt % provided cleaning compositions with both sufficient opacity as well as stability. Specifically, SLES in an amount of about 2 wt %, about 3 wt %, and about 3 wt % in combination with calcium chloride in an amount of about 3 wt %, about 2 wt %, and about 3 wt %, respectively, provide compositions having a combination of opacity or turbidity as well as stability (e.g., no phase separation or single phase) without pearling agents.

The present inventors have also surprisingly and unexpectedly discovered that combining calcium chloride at an amount of about 1 wt % and a LAS:SLES:NEODOL ratio of about 2:2:1 provided the cleaning composition with sufficient or improved opacity, viscosity, and stability without pearling agents. It was further surprisingly and unexpectedly discovered that the addition of various fragrances in combination with about 1 wt % calcium chloride and a LAS:SLES:NEODOL ratio of about 2:2:1 did not affect the opacity, viscosity, and stability of the cleaning composition.

The present inventors further surprisingly and unexpectedly discovered that the critical micelle concentration (CMC) decreases with the addition of the respective electrolytes for the surfactant system disclosed herein, which included a ratio of a first anionic surfactant to a second anionic surfactant to a nonionic surfactant (anionic:anionic:nonionic) of about 2:2:1. It was also surprisingly and unexpectedly discovered that a bivalent electrolyte or salt, such as calcium chloride, alone could be used to provide both opacity and viscosity in the surfactant system without pearling agents.

Compositions disclosed herein may be or include a cleaning composition, a cleaning product, and/or a cleaning product incorporating the cleaning composition. As used herein, a "cleaning composition" may refer to any composition that may be used for cleaning a substrate or a surface thereof. A "surface" may refer to the surface of an appliance, a fixture, or the like. The surface may include hard surfaces, such the surface of counters, sinks, cabinets, walls, appliances (e.g., kitchen appliances, bathroom appliances, etc.), fixtures (e.g., sinks, toilets, bathtubs, tiles, shower curtains, doors, etc.), or the like, or combinations thereof. The surface may also include the surface of wood or glass, floors, utensils or dishes, furniture, textiles or fabrics (e.g., clothes, carpets or rugs, cloths, bedding, leather, etc.), sponges, mops, or the like, or combinations thereof. The surface may also include polymeric surfaces, fibrous surfaces, surfaces of objects fabricated from natural or synthetic materials (e.g., protective gear, sports equipment, etc.). Accordingly, the present cleaning composition may form a portion or a basis of, be incorporated into, and/or be used in a cleaning product, such as a hard surface cleaner, a spray cleaner, a floor cleaner, a microwave cleaner, a stovetop cleaner, an oven cleaner, or the like, or combinations thereof. The cleaning product may be or include, but is not limited to, consumer product fluids, such as dish cleaners, surface cleansers, cleansers, or the like.

The cleaning composition disclosed herein may include a surfactant system and one or more electrolytes or salts. As further described herein, the surfactant system and the one or more electrolytes may interact synergistically with one another to provide sufficient or improved opacity, viscosity, and/or stability to the cleaning composition. The surfactant system and the one or more electrolytes may provide sufficient or improved opacity, viscosity, and/or stability to the cleaning composition without any opacifying or pearling agents. For example, the cleaning composition may be free or substantially free of opacifying or pearling agents. As used herein, the term or expression "stability" may refer to a composition having or maintaining a single phase (e.g., no phase separation) and/or a composition having no precipitates. The stability of a composition may be determined with or without exposing the composition to one or more aging conditions, such as exposing the composition to UV radiation or sunlight, elevated temperatures (e.g., >60° C. or about 63° C.), or the like, for extended periods of time (e.g., >1 day, >2 days, >3 days, etc.).

The cleaning product or the cleaning composition thereof may include a surfactant system including one or more surfactants. The one or more surfactants may be or include anionic, nonionic, cationic, amphoteric surfactants, or combinations thereof. In an exemplary implementation, the surfactant system may include at least one anionic surfactant and at least one nonionic surfactant. In a preferred implementation, the surfactant system includes at least two anionic surfactants and a nonionic surfactant. For example, the surfactant system may include a first anionic surfactant, a second anionic surfactant, and a nonionic surfactant. In another example, the surfactant system may consist of or consist essentially of the first and second anionic surfactants and the nonionic surfactant. For example, the surfactant system may consist of or consist essentially of the surfactants capable of interacting synergistically with the electrolyte(s) to provide sufficient opacity, viscosity, and/or stability without pearling agents.

In at least one implementation, the surfactant system may include at least one nonionic surfactant. The nonionic surfactant may be or include one or more alkoxylated nonionic surfactants, such as ethoxylated and propoxylated nonionic surfactants. Alkoxylated surfactants may be selected from the classes of the nonionic condensates of alkyl phenols, nonionic ethoxylated alcohols, nonionic ethoxylated/propoxylated fatty alcohols, nonionic ethoxylate/propoxylate condensates with propylene glycol, and the nonionic ethoxylate condensation products with propylene oxide/ethylene diamine adducts. Illustrative nonionic surfactants may include, but are not limited to, water soluble nonionic surfactants, such as primary aliphatic alcohol ethoxylates, secondary aliphatic alcohol ethoxylates, alkylphenol ethoxylates, and ethylene-oxide propylene oxide condensates on primary alkanols, or the like, or mixtures thereof. For example, the nonionic surfactants may be or include PLURAFAC®, commercially available from BASF Corp. of Florham Park, NJ. In another example, the nonionic surfactants may be or include condensates of ethylene oxide with sorbitan fatty acid esters such as those available under the various TWEEN® trade names, commercially available from ICI Surfactants of New York, NY. The nonionic surfactant of the cleaning composition may also be or include a higher aliphatic, C9-15 primary alcohol (containing about 9 to 15 carbon atoms), such as C9-C11 alkanol condensed with 4 to 10 moles of ethylene oxide. For example, the nonionic surfactant may be a reaction product (e.g., a condensation product) of C9-C11 alkanol and 2.5 to 10 moles of ethylene oxide, C12-13 alkanol and 6.5 moles of ethylene oxide, C12-15 alkanol and 12 moles of ethylene oxide, C14-15 alkanol with 13 moles ethylene oxide, C9-C11 alkanol and about 7.5 to 8.1 moles of ethylene oxide, or the like, or combinations thereof. For example, the nonionic surfactants may be or include, but is not limited to, alkoxylated fatty alcohol nonionic surfactants marketed under the tradename NEODOL® or DOBANOL®, which are commercially available from Shell Chemical Company of Houston, Texas. For example, the nonionic surfactants may be or include, but are not limited to, NEODOL® 91-2.5, 91-5, 91-6, 91-8, or 91-8.4, NEODOL® 23-6.5, NEODOL® 25-12, NEODOL® 45-13, NEODOL® 135, NEODOL® 67, NEODOL® 23-9, NEODOL® 25-3, or the like, or combinations thereof. In a preferred implementation, the nonionic surfactants include NEODOL® 91-8 (CAS No. 66455-17-2). For example, the nonionic surfactants may include a combination of ethylene oxide (CAS: 75-21-8) and C9-C11 alcohol ethoxylates (CAS No. 68439-46-3).

The amount or concentration of any one or more of the nonionic surfactants in the surfactant system or the cleaning composition may be varied to increase and/or decrease the opacity, stability, and/or viscosity of the cleaning composition. Any one or more of the nonionic surfactants may be present in the surfactant system or the cleaning composition in an amount of from about 0.2 wt % to about 1 wt %, based on a total weight of the surfactant system or the cleaning composition, respectively. For example, any one or more of the nonionic surfactants may be present in the surfactant system or the cleaning composition in an amount of from about 0.4 wt % to about 0.6 wt %, about 0.7 wt %, about 0.8 wt %, about 0.9 wt %, or about 1 wt %, based on the total weight of the surfactant system or the cleaning composition. In another example, any one or more of the nonionic surfactants may be present in the surfactant system or the cleaning composition in an amount of from about 0.4 wt %, about 0.6 wt %, about 0.7 wt %, about 0.8 wt %, or about 0.9 wt % to about 1 wt %, based on the total weight of the surfactant system or the cleaning composition.

In at least one implementation, the surfactant system may include at least one anionic surfactants. For example, the surfactant system may include a single anionic surfactant. In another example, the surfactant system may include two or more anionic surfactants, such as a synergistic combination of two anionic surfactants.

The anionic surfactant may include, but is not limited to, one or more alkyl sulfonates. For example, the anionic surfactant may include linear alkylbenzene sulfonates (LAS) or linear alkylbenzene sulfonic acid (LABSA), such as a magnesium linear alkylbenzene sulfonate, a sodium linear alkylbenzene sulfonate, or the like, or combinations thereof. The LAS may be formed from the sulfonation of a linear alkylbenzene. The LAS may have a higher content of 3-phenyl or higher isomers, and a correspondingly lower content (<50%) of 2-phenyl or lower isomers. For example, the LAS may have more species or isomers where the benzene ring is bonded or attached at the 3 position or higher than the 2 position or lower. For example, the LAS may have more species or isomers where the benzene ring may be bonded at the 3 position, the 4 position, the 5 position, the 6 position, the 7 position, and/or higher of the alkyl group, and less isomers where the benzene ring may be bonded at the 2 position and/or the 1 position. The LAS may include, but is not limited to, C10-13 alkylbenzene sulfonates. In a preferred implementation, the LAS may be sodium dodecylbenzenesulfonate (NaDDBS).

The anionic surfactant may also include, but is not limited to, sodium lauryl ether sulfate (SLES), also referred to as sodium laureth sulfate. In at least one implementation, the sodium lauryl ether sulfate may have an average of about 1 to about 10 moles of ethylene oxide per mole. In another implementation, the sodium lauryl ether sulfate may have an average of about 2 to about 3 moles of ethylene oxide per mole.

In a preferred implementation, the anionic surfactants of the surfactant system includes a combination of a LAS and a sodium lauryl ether sulfate (SLES). The weight or molar ratio and/or amounts of the LAS to SLES may be varied to increase and/or decrease the opacity, stability, and/or viscosity of the cleaning compositions. The surfactant system may have a LAS to SLES weight or molar ratio of from about 0.5:1 to about 1.5:1. For example, the surfactant system may have a LAS to SLES weight or molar ratio of about 0.5:1, about 0.6:1, about 0.7:1, about 0.8:1, about 0.9:1, about 1:1, about 1.1:1, about 1.2:1, about 1.3:1, about 1.4:1, or about 1.5:1. In another example, the surfactant system may have a LAS to SLES weight or molar ratio of from about 0.5:1, about 0.6:1, about 0.7:1, about 0.8:1, or about 0.9:1 to about 1:1, about 1.1:1, about 1.2:1, about 1.3:1, about 1.4:1, or about 1.5:1. In a preferred implementation, the surfactant system includes LAS and SLES in a weight ratio of from about 0.8:1 to about 1.2:1, preferably about 0.9:1 to about 1.1:1, more preferably about 1:1 (2.2).

The amount or concentration of any one or more of the anionic surfactants in the surfactant system or the cleaning composition may be varied to increase and/or decrease the opacity, stability, and/or viscosity of the cleaning composition. Any one or more of the anionic surfactants may be present in the surfactant system or the cleaning composition in an amount of from about 0.6 wt % to about 3 wt %, based on a total weight of the surfactant system or the cleaning composition, respectively. For example, any one or more of the anionic surfactants may be present in the surfactant system or the cleaning composition in an amount of from about 0.6 wt % to about 0.8 wt %, about 1 wt %, about 1.2 wt %, about 1.4 wt %, about 1.6 wt %, about 1.8 wt %, about 2 wt %, about 2.2 wt %, about 2.4 wt %, about 2.6 wt %, about 2.8 wt %, or about 3 wt %, based on a total weight of the surfactant system or the cleaning composition, respectively. In another example, any one or more of the anionic surfactants may be present in the surfactant system or the cleaning composition in an amount of from about 0.6 wt %, about 0.8 wt %, about 1 wt %, about 1.2 wt %, about 1.4 wt %, about 1.6 wt %, about 1.8 wt %, about 2 wt %, about 2.2 wt %, about 2.4 wt %, about 2.6 wt %, or about 2.8 wt % to about 3 wt %, based on a total weight of the surfactant system or the cleaning composition, respectively.

In a preferred implementation, the surfactant system includes a combination of one or more anionic surfactants and one or more nonionic surfactants. For example, the surfactant system may include at least one nonionic surfactant and at least two anionic surfactants. In an exemplary implementation, the surfactant system includes a synergistic combination of LAS, SLES, and an alkoxylated fatty alcohol nonionic surfactant, such as a reaction product (e.g., a condensation product) of C9-C11 alkanol and about 7.5 to 8.1 moles of ethylene oxide (e.g., NEODOL®). In another example, the surfactant system consists of or consists essentially of a synergistic combination of LAS, SLES, and an alkoxylated fatty alcohol nonionic surfactant, such as a reaction product (e.g., a condensation product) of C9-C11 alkanol and about 7.5 to 8.1 moles of ethylene oxide (e.g., NEODOL®). As further demonstrated herein, the synergistic combination provides sufficient or improved opacity, viscosity, and/or stability to the cleaning composition without any opacifying or pearling agents.

The combination of the LAS, SLES, and the alkoxylated fatty alcohol nonionic surfactant, such as the reaction product (e.g., a condensation product) of C9-C11 alkanol and about 7.5 to 8.1 moles of ethylene oxide (e.g., NEODOL®) may be present in a weight or molar ratio sufficient to increase opacity, stability, and/or viscosity of the cleaning composition. In at least one implementation, the LAS, SLES, and the alkoxylated fatty alcohol nonionic surfactant is present in a weight ratio of about 2:2:1. For example, the surfactant system may include any one of the anionic surfactants and the nonionic surfactant in a weight ratio of from about 1.5:1 to about 2.5:1. For example, the surfactant system may include any one of the anionic surfactants and the nonionic surfactant in a weight ratio of about 1.5:1, about 1.6:1, about 1.7:1, about 1.8:1, about 1.9:1, about 2:1, about 2.1:1, about 2.2:1, about 2.3:1, about 2.4:1, or about 2.5:1. In another example, the surfactant system may include any one of the anionic surfactants and the nonionic surfactant in a weight ratio of from about 1.5:1, about 1.6:1, about 1.7:1, about 1.8:1, or about 1.9:1 to about 2:1, about 2.1:1, about 2.2:1, about 2.3:1, about 2.4:1, or about 2.5:1. In a preferred implementation, the surfactant system includes LAS, SLES, and the alkoxylated fatty alcohol nonionic surfactant in a weight ratio of about 2 to about 2 to about 1 (about 2:2:1).

The cleaning product or the cleaning composition thereof may include one or more electrolytes or salts capable of or configured to interact synergistically with the surfactant system and/or the one or more surfactants thereof to provide sufficient or improved opacity, viscosity, and/or stability to the cleaning composition. The one or more electrolytes may be or include, but are not limited to, a monovalent salt, a multivalent salt, such as a bivalent salt, or combinations thereof. Illustrative monovalent salts may be or include, but are not limited to, any alkali metal or ammonium salts containing monovalent anions, such as chloride, nitrate, or the. For example, the monovalent salt may be or include, sodium chloride, sodium salicylate, or the like, or combinations thereof. Illustrative multivalent salts may be or include, but are not limited to, calcium salts, magnesium salts, strontium salts, barium salts, copper salts, zinc salts, manganese salts, or the like, or combinations thereof, where the counter ions may be halides (e.g., fluoride, chloride, bromide); carbonate; hydroxide; carboxylates (e.g., formate, acetate, etc.); nitrate; sulfate; phosphate; or the like, or combinations thereof. In a preferred implementation, the one or more electrolytes includes a bivalent salt. For example, the one or more electrolytes include calcium chloride.

The one or more electrolytes may be present in an amount sufficient to interact synergistically with the surfactant system and/or the one or more surfactants thereof to provide sufficient or improved opacity, viscosity, and/or stability to the cleaning composition. In at least one implementation, the one or more electrolytes are present in an amount of from greater than 0 wt % to about 10 wt %, based on a total weight of the cleaning composition. For example, the one or more electrolytes may be present in an amount of greater than 0 wt %, about 1 wt %, about 2 wt %, about 3 wt %, about 4 wt %, about 5 wt %, about 6 wt %, about 7 wt %, about 8 wt %, about 9 wt %, or about 10 wt %, based on a total weight of the cleaning composition. In another example, the one or more electrolytes may be present in an amount of from greater than 0 wt % to about 5 wt %, about 1 wt % to about 3 wt %, or about 2 wt %. In a preferred implementation, the one or more electrolytes includes calcium chloride in an amount of from greater than 0 wt % to about 5 wt %, more preferably about 0.2 wt % to about 1 wt %, 0.5 wt % to about 1 wt %, 1 wt % to about 3 wt %, or about 2 wt %. The amount of the one or more electrolytes may be present in an amount to provide sufficient opacity while also providing increased viscosity.

The cleaning composition may further include one or more additional ingredients or components. The additional ingredients/components may be or include, but are not limited to, any one or more of fragrances, essential oils, water, emulsifying agents, thickeners, colorants, natural actives, therapeutic actives, antimicrobial agents, natural extracts, pH modifying agents (e.g., acids, bases, and/or buffers), pearlizers, opacifying agents, dyes, preservatives, or the like, or any mixture or combination thereof. It should be appreciated that in a preferred implementation, the cleaning composition is free or substantially free of pearlizers and opacifying agents. Illustrative pearlizers and opacifying agents may be or include, but are not limited to, ACUSOL OP305 Opacifier, Euperlan PK 3000AM, Plantatex HCC, Lamesoft TM Benz, or the like, or combinations thereof.

Water of the cleaning composition may be deionized water, demineralized water, and/or softened water. Water may make up the balance of the cleaning composition. For example, the amount of water in the cleaning composition may be from about 10 wt % to 98 wt %, about 40 wt % to about 95 wt %, or about 60 wt % to about 90 wt %. In another example, the amount of water in the cleaning composition may be at least 60 wt %, at least 70 wt %, at least 75 wt %, at least 80 wt %, at least 85 wt %, at least 90 wt %, at least 95 wt %, at least 98 wt %, or greater. The amount of water in the cleaning composition may include free water added and water introduced with other components or materials of the cleaning composition. For example, the amount of the water in the cleaning composition may include free water and water associated with the surfactants or any other component of the cleaning composition.

The cleaning composition may be free or substantially free from conventional thickeners. Illustrative thickeners may be or include, but are not limited to, Primal AC 2337, Acusol 820, NO. 2 ACRYL WATER EMULSION, or the like, or combinations thereof.

In at least one implementation, the cleaning composition may include one or more acids, one or more bases, and/or one or more buffers or buffering agents configured to adjust or control the pH of the cleaning composition. The one or more acids, one or more bases, and/or one or more buffers may, separately and independently, be present in an amount of from greater than 0 weight % to less than or equal to about 10 weight %, less than or equal to about 8 weight %, less than or equal to about 6 weight %, less than or equal to about 4 weight %, less than or equal to about 2 weight %, less than or equal to about 1 weight %, less than or equal to about 0.6 wt %, less than or equal to about 0.5 weight %, or less than or equal to about 0.4 wt %, based on a total weight of the cleaning composition. Illustrative bases may include, but are not limited to, ammonia; mono-, di-, and tri-alkyl amines; mono-, di-, and tri-alkanolamines; alkali metal and alkaline earth metal hydroxides; sodium hydroxide, potassium hydroxide, lithium hydroxide, monoethanolamine, triethylamine, isopropanolamine, diethanolamine, triethanolamine, or the like, or combinations thereof. Illustrative acids may include, but are not limited to, mineral acids, such as hydrochloric acid, nitric acid, phosphoric acid, and sulfuric acid, polycarboxylic and/or organic acids, such as citric acid, acetic acid, lactic acid, glycolic acid, formic acid, butyric acid, propionic acid, valeric acid, malic acid, oxalic acid, carbonic acid, taurine, or the like, or combinations thereof.

In a preferred implementation, the cleaning composition includes at least one organic acid, such as lactic acid, present in an amount of from greater than 1 weight % to about 6 weight %, from about 1 weight % to about 3 weight %, from about 1 weight % to about 2 weight %, or about 1.2 weight %, based on a total weight of the cleaning composition. It should be appreciated that, in addition to modifying the pH of the personal care composition, lactic acid may also provide one or more additional benefits to the cleaning composition. For example, the lactic acid may function as a descaling agent, a soap-scum removing agent, an antibacterial agent, or combinations thereof. Lactic acid is also a natural ingredient. It should further be appreciated that the combination of lactic acid and surfactant may work synergistically to provide a broad spectrum antibacterial properties.

The cleaning composition may include one or more fragrances or perfumes. As used herein, the term or expression "fragrance" or "perfume" may be used in its ordinary sense to refer to and include any water soluble or non-water soluble fragrant substance or mixture of substances including natural fragrances (e.g., obtained by extraction of flower, herb, blossom or plant), artificial fragrances (e.g., mixture of natural oils or oil constituents), synthetically produced odoriferous substances or fragrances, or combinations thereof. The fragrances may be or include free fragrances, encapsulated fragrances, or a mixture thereof. Illustrative fragrances may be or include, but are not limited to, dazzling deodarome 469871, Brightday Deodorame 469872 D, Fresh Dew Moc 289785 F, Brightday Deodorame 469872 D, Nicky CP 225048 B, Sphery Bloom Lif Eco EAI 63028/00, Fancy lemon, Marengo Cov, Citrusfruits Neodol Perfume, Sphery Bloom (29310), Andelicia Mod (29360), Cicada 44, Odessa Mod (29338), Doctor Citrus Haloscent 290918 F, Eutopia 362, Modernlavander H. 288497 BT, Pine Oil NO. 2, Cizestopure Opt (29473), Nickynature Mod (29468), or combinations thereof.

The cleaning composition may include the one or more fragrances in an amount of from greater than 0 wt % to about 1 wt %, based on a total weight of the cleaning composition. In a preferred implementation, the one or more fragrances may be present in an amount of about 0.48 wt % to about 0.75 wt % or about 0.39 wt % to about 0.55 wt %.

The present disclosure may provide methods for preparing any one or more of the cleaning compositions disclosed herein. The method may include mixing, stirring, combining, or otherwise contacting the surfactant system, the one or more electrolytes, the additional components, or combinations thereof with one another to prepare the cleaning composition. The method may not include combining or contacting any pearlizers or opacifying agents to prepare the cleaning composition.

The present disclosure may also provide methods for cleaning a surface or substrate. The method may include contacting the substrate with any one of the compositions disclosed herein.

EXAMPLES

The examples and other implementations described herein are exemplary and not intended to be limiting in describing the full scope of compositions and methods of this disclosure. Equivalent changes, modifications and variations of specific implementations, materials, compositions and methods may be made within the scope of the present disclosure, with substantially similar results.

Example 1

Exemplary cleaning compositions including varying amounts of at least one salt and a surfactant system including at least one nonionic surfactant and/or at least one anionic surfactant were prepared to evaluate the ability for achieving sufficient opacification and/or viscosity without an opacifying agent (e.g., pearlizing agent). Specifically, 81 exemplary cleaning compositions were prepared by combining the surfactant and the electrolyte or salt in the amounts according to Table 1, where the balance was provided by water. The total weight of each of the cleaning compositions was about 200 grams.

After preparing the cleaning compositions, the opacity and stability were evaluated visually. The cleaning compositions were allowed to age about 10 min, about 60 min, about 24 hours, about 1 week, and about 2 weeks as well to observe stability.

TABLE 1

| Surfactant[1,2,3] | Concentration (wt %) | Electrolyte | Concentration (wt %) | Opacity | Stability |
|---|---|---|---|---|---|
| NEODOL | 1% | $MgSO_4$ | 1% | Transparent | One phase |
| NEODOL | 1% | $MgSO_4$ | 2% | Transparent | One phase |
| NEODOL | 1% | $MgSO_4$ | 3% | Transparent | One phase |
| NEODOL | 2% | $MgSO_4$ | 1% | Transparent | One phase |
| NEODOL | 2% | $MgSO_4$ | 2% | Transparent | One phase |
| NEODOL | 2% | $MgSO_4$ | 3% | Transparent | One phase |
| NEODOL | 3% | $MgSO_4$ | 1% | Transparent | One phase |
| NEODOL | 3% | $MgSO_4$ | 2% | Transparent | One phase |
| NEODOL | 3% | $MgSO_4$ | 3% | Transparent | One phase |
| SLES | 1% | $MgSO_4$ | 1% | Transparent | One phase |
| SLES | 1% | $MgSO_4$ | 2% | Transparent | One phase |
| SLES | 1% | $MgSO_4$ | 3% | Transparent | One phase |
| SLES | 2% | $MgSO_4$ | 1% | Transparent | One phase |
| SLES | 2% | $MgSO_4$ | 2% | Transparent | One phase |
| SLES | 2% | $MgSO_4$ | 3% | Transparent | One phase |
| SLES | 3% | $MgSO_4$ | 1% | Transparent | One phase |
| SLES | 3% | $MgSO_4$ | 2% | Transparent | One phase |
| SLES | 3% | $MgSO_4$ | 3% | Transparent | One phase |
| LABSA | 1% | $MgSO_4$ | 1% | Transparent | Sedimentation |
| LABSA | 1% | $MgSO_4$ | 2% | Transparent | Sedimentation |
| LABSA | 1% | $MgSO_4$ | 3% | Transparent | Sedimentation |
| LABSA | 2% | $MgSO_4$ | 1% | Transparent | Sedimentation |
| LABSA | 2% | $MgSO_4$ | 2% | Transparent | Sedimentation |
| LABSA | 2% | $MgSO_4$ | 3% | Transparent | Sedimentation |
| LABSA | 3% | $MgSO_4$ | 1% | Transparent | Sedimentation |
| LABSA | 3% | $MgSO_4$ | 2% | Transparent | Sedimentation |
| LABSA | 3% | $MgSO_4$ | 3% | Transparent | Sedimentation |
| NEODOL | 1% | $CaCl_2$ | 1% | Transparent | Sedimentation |
| NEODOL | 1% | $CaCl_2$ | 2% | Transparent | Sedimentation |
| NEODOL | 1% | $CaCl_2$ | 3% | Transparent | Sedimentation |
| NEODOL | 2% | $CaCl_2$ | 1% | Transparent | Sedimentation |
| NEODOL | 2% | $CaCl_2$ | 2% | Transparent | Sedimentation |
| NEODOL | 2% | $CaCl_2$ | 3% | Transparent | Sedimentation |
| NEODOL | 3% | $CaCl_2$ | 1% | Transparent | Sedimentation |
| NEODOL | 3% | $CaCl_2$ | 2% | Transparent | Sedimentation |
| NEODOL | 3% | $CaCl_2$ | 3% | Transparent | Sedimentation |
| SLES | 1% | $CaCl_2$ | 1% | Transparent | Sedimentation |
| SLES | 1% | $CaCl_2$ | 2% | Transparent | Sedimentation |
| SLES | 1% | $CaCl_2$ | 3% | Transparent | Sedimentation |
| SLES | 2% | $CaCl_2$ | 1% | Transparent | Sedimentation |
| SLES | 2% | $CaCl_2$ | 2% | Transparent | Sedimentation |
| SLES | 2% | $CaCl_2$ | 3% | Opaque | One phase |
| SLES | 3% | $CaCl_2$ | 1% | Transparent | Sedimentation |
| SLES | 3% | $CaCl_2$ | 2% | Opaque | One phase |
| SLES | 3% | $CaCl_2$ | 3% | Opaque | One phase |
| LABSA | 1% | $CaCl_2$ | 1% | Transparent | Sedimentation |
| LABSA | 1% | $CaCl_2$ | 2% | Transparent | Sedimentation |
| LABSA | 1% | $CaCl_2$ | 3% | Transparent | Sedimentation |
| LABSA | 2% | $CaCl_2$ | 1% | Transparent | Sedimentation |
| LABSA | 2% | $CaCl_2$ | 2% | Transparent | Sedimentation |
| LABSA | 2% | $CaCl_2$ | 3% | Transparent | Sedimentation |
| LABSA | 3% | $CaCl_2$ | 1% | Transparent | Sedimentation |
| LABSA | 3% | $CaCl_2$ | 2% | Transparent | Sedimentation |
| LABSA | 3% | $CaCl_2$ | 3% | Transparent | Sedimentation |
| NEODOL | 1% | NaCl | 1% | Transparent | One phase |
| NEODOL | 1% | NaCl | 2% | Transparent | One phase |
| NEODOL | 1% | NaCl | 3% | Transparent | One phase |
| NEODOL | 2% | NaCl | 1% | Transparent | One phase |
| NEODOL | 2% | NaCl | 2% | Transparent | One phase |
| NEODOL | 2% | NaCl | 3% | Transparent | One phase |
| NEODOL | 3% | NaCl | 1% | Transparent | One phase |
| NEODOL | 3% | NaCl | 2% | Transparent | One phase |
| NEODOL | 3% | NaCl | 3% | Transparent | One phase |
| SLES | 1% | NaCl | 1% | Transparent | One phase |
| SLES | 1% | NaCl | 2% | Transparent | One phase |
| SLES | 1% | NaCl | 3% | Transparent | One phase |
| SLES | 2% | NaCl | 1% | Transparent | One phase |
| SLES | 2% | NaCl | 2% | Transparent | One phase |
| SLES | 2% | NaCl | 3% | Transparent | One phase |
| SLES | 3% | NaCl | 1% | Transparent | One phase |
| SLES | 3% | NaCl | 2% | Transparent | One phase |
| SLES | 3% | NaCl | 3% | Transparent | One phase |
| LABSA | 1% | NaCl | 1% | Transparent | One phase |
| LABSA | 1% | NaCl | 2% | Transparent | One phase |
| LABSA | 1% | NaCl | 3% | Transparent | One phase |
| LABSA | 2% | NaCl | 1% | Transparent | One phase |

TABLE 1-continued

| Surfactant[1,2,3] | Concentration (wt %) | Electrolyte | Concentration (wt %) | Opacity | Stability |
|---|---|---|---|---|---|
| LABSA | 2% | NaCl | 2% | Transparent | One phase |
| LABSA | 2% | NaCl | 3% | Transparent | One phase |
| LABSA | 3% | NaCl | 1% | Transparent | One phase |
| LABSA | 3% | NaCl | 2% | Transparent | One phase |
| LABSA | 3% | LABSA | 3% | Transparent | One phase |

[1]NEODOL ®: Alkoxylated fatty alcohol nonionic surfactant commercially available from Shell Chemical Company of Houston, Texas
[2]SLES: Anionic surfactant, sodium lauryl ether sulfate (sodium laureth sulfate)
[3]LABSA: Anionic surfactant, linear alkylbenzene sulfonic acid (linear alkylbenzene sulfonate)

As indicated in Table 2, it was surprisingly and unexpectedly discovered that the combination of SLES and calcium chloride provided compositions with both sufficient opacity as well as stability. Specifically, SLES (about 26%) in an amount of about 2 wt %, about 3 wt %, and about 3 wt % in combination with calcium chloride in an amount of about 3 wt %, about 2 wt %, and about 3 wt %, respectively, provided compositions having a combination of opacity or turbidity as well as stability with a single phase (e.g., no phase separation and/or sedimentation). It was observed that magnesium sulfate, while a bivalent was not capable of preparing an opaque composition. Without being bound by theory, it is believed that the anion was a key element in the system and a key element for the opacity. For example, the arrangement of the ions at least partially depend on the anion; as such, the charge and/or molecular size of the anion may contribute to the opacity.

Example 2

As noted above, the combination of SLES and calcium chloride provided both opacity and stability. Based on the results from Example 1, additional cleaning compositions were prepared with relatively higher concentrations of SLES with varying concentrations of calcium chloride. Particularly, a 26 wt % solution of SLES was prepared and combined with calcium chloride according to Table 2. The results are summarized in Table 2.

TABLE 2

| | | SLES (26% Purity) | |
|---|---|---|---|
| Electrolyte | % | 2% | 3% |
| $CaCl_2$ | 2% | 2 Phases<br>Phase Separation<br>Not Stable | High Opacity<br>High viscosity |
| | 3% | High Opacity<br>High Viscosity | High Opacity<br>High Viscosity |

Example 3

Based on Examples 1 and 2, it was proposed that a mixture of surfactants including LABSA and SLES in a ratio of about 1:1 would provide sufficient interactions between the surfactant and the electrolyte. Changing the Surfactant ratio the opacity and viscosity was compromised and also the stability of the formula was a factor for this specific ratio election. Particularly, it was proposed that LAS:SLES:NEODOL ratios of about 3:3:2 and about 2:2:1 may provide sufficient interactions between the surfactant system and the electrolyte, calcium chloride. As such, additional cleaning compositions were prepared according to Table 3.

TABLE 3

| Varying Ratio of LAS:SLES:NEODOL | | | | |
|---|---|---|---|---|
| | | Ratio | | |
| Electrolyte | wt % | LAS | SLES | NEODOL |
| $CaCl_2$ | 1-2 | 3 | 3 | 2 |
| | | 2 | 2 | 1 |

It was observed that the ratio of LAS:SLES:NEODOL of about 3:3:2 exhibited phase separation when aged in sunlight at about 63° C. for about 72 hours. It was surprisingly and unexpectedly discovered that combining calcium chloride at an amount of about 1 wt % and a LAS:SLES:NEODOL ratio of about 2:2:1 provided sufficient opacity, sufficient viscosity, and stability. It was further surprisingly and unexpectedly discovered that the addition of various fragrances in combination with about 1 wt % calcium chloride and a LAS:SLES:NEODOL ratio of about 2:2:1 did not affect the opacity, viscosity, and stability of the cleaning composition.

Example 4

Exemplary cleaning compositions including a LAS:SLES:NEODOL weight ratio of about 2:2:1 and either calcium chloride (a bivalent salt) or sodium chloride (a monovalent salt) were prepared. The amount of the electrolyte, either calcium chloride or sodium chloride, was varied from about 0 wt % to about 10 wt %. Each of the cleaning compositions were prepared by combining the components according to Table 4.

TABLE 4

| INGREDIENTS | Wt % |
|---|---|
| Water | Balance |
| 38% $Na_2O$ Caustic Soda | 0.58 |
| LABSA | 2.0 |
| SLES | 2.0 |
| Lactic Acid - 88% | 1.2 |
| NEODOL | 1.0 |
| Fragrance | 0.63 |
| Electrolyte | 0-10 |
| Total | 100 |

Conductance of each of the cleaning compositions was measured using a digital conductivity meter. It should be appreciated that the lowest conductivity reflects the maximum opacity, but is not equal with conductivity. The conductance of each of the cleaning compositions is summarized in Table 5.

TABLE 5

| | $CaCl_2$ | | NaCl | |
|---|---|---|---|---|
| Concentration (wt %) | Conductivity (μS/cm) | Viscosity (cP) | Conductivity (μS/cm) | Viscosity (cP) |
| 0 | 4,924.93 | N/A | 4,941.17 | N/A |
| 0.5 | 10,067.50 | 9.60 | 12,018.50 | 11.20 |
| 0.8 | 311.11 | 22.40 | 15,199.70 | 16.00 |
| 0.9 | 285.94 | 28.80 | 12,742.20 | 12.00 |
| 1 | 410.62 | 75.00 | 17,123.40 | 19.20 |
| 2 | 181.19 | 28.80 | 396.40 | 18.40 |
| 3 | 261.38 | 26.40 | 205.55 | 12.00 |
| 4 | 226.77 | 223.20 | 195.13 | 12.80 |

TABLE 5-continued

| | $CaCl_2$ | | NaCl | |
|---|---|---|---|---|
| Concentration (wt %) | Conductivity (μS/cm) | Viscosity (cP) | Conductivity (μS/cm) | Viscosity (cP) |
| 5 | 205.35 | 632.80 | 222.13 | 26.40 |
| 7.5 | 255.35 | 24.00 | 263.66 | 20.00 |
| 10 | 2,834.10 | OOR* | 299.98 | 15.20 |

*OOR: Out of Range

It was observed that the conductivity and the concentration of the electrolyte did not exhibit a linear relationship. It was, however, surprisingly and unexpectedly discovered that significant opacity was observed when relatively low conductivity was measured. Without being bound by theory, it is believed that a surfactant system including a ratio of an anionic surfactant to an anionic surfactant to a nonionic surfactant (anionic:anionic:nonionic) of about 2:2:1, a concentration of calcium chloride of about 1 wt % to about 2 wt % provided sufficient opacity. It was further observed that the viscosity increased directly with the increasing concentration of the electrolyte, which was attributed to the interaction between the electrolyte and the anionic surfactant, such as SLES.

As illustrated in Table 5, sodium chloride in concentrations of from about 3 wt % to about 5 wt % provided adequate opacity in the surfactant system. It was further observed that the interactions between the monovalent salt, sodium chloride, with the anionic surfactant, SLES, did not have a direct relationship with viscosity.

Based on the foregoing, it was surprisingly discovered that the critical micelle concentration (CMC) decreases with the addition of the respective electrolytes for the surfactant system including a ratio of an anionic surfactant to an anionic surfactant to a nonionic surfactant (anionic:anionic:nonionic) of about 2:2:1. It was further surprisingly and unexpectedly discovered that the electrolyte alone could be used to provide both opacity and viscosity in the surfactant system.

The present disclosure has been described with reference to exemplary implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. A cleaning composition, comprising:

a surfactant system comprising one or more surfactants; and one or more salts;

wherein the one or more salts comprise calcium chloride and the one or more surfactants comprise sodium lauryl ether sulfate (SLES);

wherein the cleaning composition comprises, based on the total weight of the cleaning composition, 2 wt % SLES and 3 wt % calcium chloride, 3 wt % SLES and 2 wt % calcium chloride, or 3 wt % SLES and 3 wt % calcium chloride;

wherein the cleaning composition is opaque without an opacifying agent or pearlizing agent; and wherein the cleaning composition has no phase separation and/or sedimentation.

2. The cleaning composition of claim 1, wherein the cleaning composition is substantially free of thickeners.

3. The cleaning composition of claim 1, wherein the one or more surfactants further comprise a linear alkylbenzene sulfonates (LAS).

4. The cleaning composition of claim 3, wherein the cleaning composition comprises a ratio of LAS to SLES of from about 0.5:1 to about 1.5:1.

5. The cleaning composition of claim 1, wherein the one or more surfactants comprise a nonionic surfactant and two anionic surfactants.

6. The cleaning composition of claim 5, wherein the nonionic surfactant comprises alkoxylated fatty alcohol nonionic surfactants.

7. The cleaning composition of claim 5, wherein the two anionic surfactants comprise LAS and SLES.

8. The cleaning composition of claim 5, wherein the one or more surfactants consist of the nonionic surfactant and the two anionic surfactants.

9. The cleaning composition of claim 1, wherein the surfactant system comprises LAS, SLES, and alkoxylated fatty alcohol present with a LAS:SLES:alkoxylated fatty alcohol ratio of about 2:2:1.

10. The cleaning composition of claim 9, further comprising a fragrance, wherein the presence of the fragrance does not affect opacity, viscosity, and stability of the cleaning composition.

11. The cleaning composition of claim 5, wherein the one or more surfactants comprise LAS, SLES, and alkoxylated fatty alcohol in a ratio of about 3:3:2 to about 2:2:1, respectively.

12. A method for preparing the cleaning composition of claim 1, the method comprising contacting the surfactant system and the one or more salts with one another.

* * * * *